G. RITTER.
POLYSTATION LINE CIRCUIT.
APPLICATION FILED FEB. 12, 1910.

1,009,182.

Patented Nov. 21, 1911.

WITNESSES:

INVENTOR,
GEORG RITTER,
by Attorney.

UNITED STATES PATENT OFFICE.

GEORG RITTER, OF STUTTGART, GERMANY.

POLYSTATION LINE-CIRCUIT.

1,009,182.      Specification of Letters Patent.      Patented Nov. 21, 1911.

Application filed February 12, 1910. Serial No. 543,578.

*To all whom it may concern:*

Be it known that I, GEORG RITTER, a citizen of the German Empire, residing at Stuttgart, in the Kingdom of Wurttemberg, Empire of Germany, have invented certain new and useful Improvements in Polystation Line-Circuits; and I do hereby declare the following to be a full, clear, and exact description of the invention, such as will enable others skilled in the art to which it appertains to make and use the same.

In telephone and telegraph systems which have one line connecting a number of subscribers to an exchange or receiving station, it is desirable when one of the receiving stations is communicating with the exchange or with another subscriber, that means should be provided which will prevent the interruption of the connection or the overhearing of the conversation by anyone at another of the stations connected to the common line. A great number of systems have been devised to meet this requirement but all of these have obtained the result by arrangements which make it impossible for the other stations on the common line to get into communication so long as any one station is using the line, so that all the other stations are completely cut off when a connection has been made to one. It is thus possible for the subscriber at a single station to make all the other stations on the line unusable for any length of time either out of ill-will or by oversight, and the other stations will thus be cut off from conversation one with another or through the exchange. Apart from this disadvantage of existing systems it may also be a disadvantage to have all the other stations cut off during the normal time of conversation of one station, especially in cases of danger and emergency, where it is desirable that the other stations should be able to communicate with the exchange without interrupting the conversation which is already taking place.

An arrangement which fulfils the above requirements without possessing the disadvantages above stated, is set forth in the following specification.

The common line between the central station or call office and a number of telephone or telegraph sub-stations or subscribers' instruments, consists according to this invention of a pair of metallic conductors or mains; the sub-stations can only become switched on to this common or main line by making connections for their telephones to a bridging resistance on the one side, and to earth at the other side, the arrangement being such that the currents from the telephones must flow through the earth and through both conductors of the main line in the same direction. The switching in of the subscriber's apparatus as a bridge connection between the two branches of the common conductors, and the separation of the apparatus from its earth connection, is effected by currents from the central station. The operator at the central station can connect his telephone apparatus as required either with earth on the one hand and with the main line conductors through a bridging resistance on the other hand, or he can connect it directly across the two conductors of the main line. The closing or isolation of other stations from the common conductors is unnecessary, because an apparatus connected by a bridge across two conductors in this way can neither be disturbed nor can its conversation be overheard by an apparatus connected to earth on the one hand, and through bridging resistance to the main line conductors on the other hand. Apparatus of the kind above referred to is useful in cases where the main line conductors are to be employed simultaneously for telegraphy and telephony, and where the main line is to be used either for a number of sets of telephones or telegraphs. A great many devices are already known for enabling the exchange or call office to place itself in connection with any one of the several stations on the common line and most of these known devices can be used with the apparatus according to the present invention. As however the devices for calling up the stations do not form the subject of the present invention, they will only be referred to hereinafter in so far as they are necessary for the understanding of what takes place in the communication of the subscribers' instruments or sub-stations with the exchange or central office, and with one another.

As the present invention is principally designed for use with telephone apparatus, and as its application to telegraph apparatus does not require any essential modification, the application of the invention only to telephone apparatus will be referred to in the explanation which follows.

Fig. 9 is a diagram of a simplified arrangement of the signal receiving devices at the central station.

Figure 1:
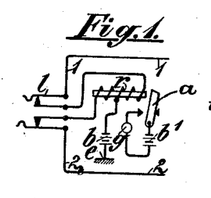
Figure 1 is a diagram showing the arrangement at the central or exchange station for a multiparty line.

First referring to Fig. 1, the two conductors of the main line are indicated by 1 and 2; $l$ is a jack socket, $r$ is the winding of an electro-magnetic calling device (a relay) the mid-point of this winding being connected to one terminal of a calling battery $b$ the other terminal of which is earthed at $e$. $a$ is an armature of the calling device which when drawn up by the relay closes a local circuit containing a battery $b^1$ and the indicator such as a glow-lamp $g$.

Figure 2:
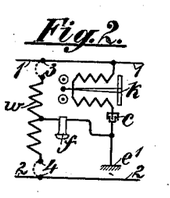
Figs. 2, 3 and 4 are diagrams showing different calling arrangements at subscribers' or local stations.
Figure 5:
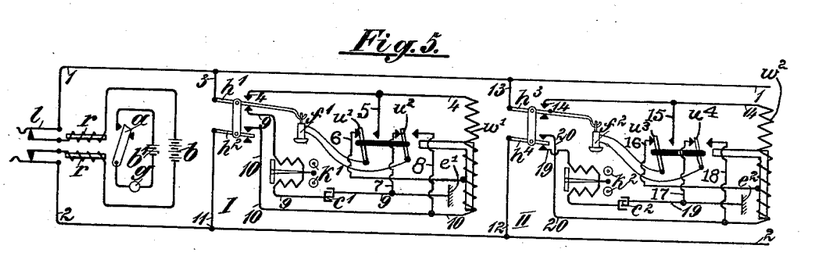
Fig. 5 is a diagram of a multiparty line showing two local stations and signal receiving means at the central station.

In the system of Fig. 2, the numerals 1 and 2 indicate again the two branches of the main line conductor, $k$ shows the calling bell, $c$ the condenser, and $w$ the bridging resistance to the mid-point of which a connection is made through the telephone instrument $f$ to earth at $e^1$. As seen in Fig. 2, the bridging resistance $w$ is separated from both the lines 1 and 2 when the apparatus is in its position of rest. If the subscriber wishes to call the exchange it is only necessary to remove the telephone $f$ from its switch hook and this then connects the bridging resistance $w$ at the points 3 and 4 with the two conductors 1 and 2 of the main line. The details of this arrangement are shown in Fig. 5 and are further described hereinafter. By means of the connection of the bridging resistance $w$ across the main line conductors, the circuit of the calling battery $b$ at the exchange is closed through $r$, $l$, 1, and from here on the one hand through 3, $w$, $f$, $e^1$ and $e$, and on the other hand through 2, 4, $w$, $f$, $e^1$ and $e$ so that the calling relay $r$ is excited drawing up its armature $a$ and closing the local circuit of the battery $b^1$ through the glow-lamp $g$; this latter is thus illuminated calling the attention of the exchange operator. The operator inserts a calling plug in the jack $l$ and thus switches into the circuit a telephone arranged in the same way as that of the calling station, and thus the subscriber and the operator can communicate with one another. The calling up of the subscriber from the exchange station is effected by means of an alternating current; in the normal position of the apparatus as shown in Fig. 2 the call-bell apparatus $k$ is the only part which is connected to the line, the connection being on the one hand to the line 1, and on the other hand through the condenser $c$ to earth at $e^1$. If the exchange operator sends an alternating current through the conductor 1 from the earth $e$, the bell $k$ will be sounded and thus the station will be called. It is also possible to have two pulsating current bells connected to each conductor in the way shown in Fig. 2 one of each pair being arranged to work only with positive current impulses and the other with negative current impulses so that the exchange can thus call up in four different ways.

Figure 3:
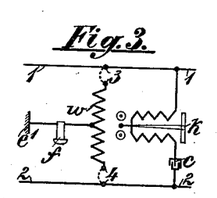

In the system of Fig. 3 the calling up of the exchange is effected in exactly the same way as before stated; on the other hand however, the bell $k$ is not connected to earth at one side but is connected across between the two conductors of the main line. In this case therefore the calling current from the exchange must pass entirely through the main line. It is possible to provide alternating current bells which will only respond to currents of a predetermined frequency and if the separate subscribers' stations on a common line are provided with bells which will only respond to currents of different frequencies, each from the others, a further means will be provided for the selective calling up of the several stations connecting in common to the line.

Figure 4:
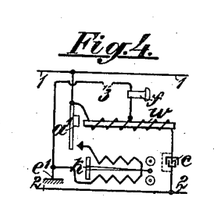

As distinguished from the devices shown in Figs. 2 and 3, the bridging resistance $w$ in the arrangement of Fig. 4 is utilized as the magnetizing coil of a relay which is connected through the condenser $c$ to both the lines 1 and 2 in the position of rest; the call bell $k$ is connected to earth but not to the line, while the circuit of the telephone $f$ is broken at the point marked 3. If the subscriber at this station removes his telephone $f$ from the switch hook in giving a call, the earth connection of the telephone $f$ is closed by the switch hook at the point 3, and at the same time the condenser $c$ is short circuited so that the calling battery $b$ has its circuit closed as by the arrangements of Figs. 1 and 2 and is caused to operate its relay $r$. If on the other hand the exchange operator is calling up the subscriber at the station shown in Fig. 4 this is effected by exciting the relay $w$ by means of suitable direct current impulses thus causing the armature $a^1$ to be drawn up so that an alternating current which flows through the conductor 1 from earth at $e$ to earth at $e^1$, can operate the bell $k$. In this case, just as in Fig. 2, it is possible to make the arrangement such that two bells can be connected to each of the two conducting lines, one of the bells being made to respond only to positive current impulses and the other only to negative current impulses so that in this way four different stations can be selectively called by the exchange. One advantage of the last described arrangement is that the line is only connected to earth while a call is being given.

There are many other arrangements known for the selective calling of the subscribers connected to a common conductor and those above described are chosen because they are the ones most used and will suffice as examples to show that the improvements according to the present invention can be used practically with the approved systems of selective calling. In the following description the details of the invention will only be described by way of example in connection with apparatus for selective calling arranged as in Fig. 2.

Fig. 5 illustrates the connections of a main line serving in common for two subscribers and shows also the calling apparatus at the central station which differs from that shown in Fig. 1 in that the calling battery $b$ is not connected to earth but is connected between the two halves of the winding of the electro-magnetic calling apparatus $r$; further several details of the arrangements of the subscribers' stations are illustrated. The various parts are lettered to correspond with Figs. 1 to 4, the further details comprising the hook switch apparatus $h^1$, $h^2$, and $h^3$, $h^4$, at the subscribers' stations and also the corresponding relay switches $u^1$, $u^2$ and $u^3$, $u^4$ for the telephones. If the exchange is to be called up from one of the subscribers' stations, for example from station II, this is effected by raising the telephone $f^2$ from the hook switch $h^3$, $h^4$ whereupon the winding $w^2$ of the bridging resistance is connected between the two lines 1 and 2 and the circuit for current from $b$ is closed through $r$, $l$, 1, 13, $h^3$, 14, $w^2$, 20, $h^4$, 12, 2 and $r$; the relay $r$ is thus excited drawing up its armature $a$ and closing the circuit of battery $b^1$ through the glow-lamp $g$. As in this case only two stations are on the line these stations can be called by the exchange operator by the usual alternating current apparatus; the device for this purpose is shown at the right hand side of Fig. 6 in connection with a jack plug. If one of the two subscribers—for instance II—is to be called up the plug $s^2$ is inserted in the jack $l$ pressing back both the springs of the socket from their contacts. If the key $t^2$ is pressed the current flows from the generator $i$ which is earthed at one side at $e^5$, through $t^2$, 24, $s^2$, $l$, 2, 12, $h^4$, 19, and the winding of $k^2$, $c^2$, $e^2$ and through the earth to $e^5$. If on the other hand the key $t^1$ is depressed the current from the generator flows in a corresponding way through the conductor 1 and through the call bell $k^1$ at station I connected to the conductor 1.

Figure 6:
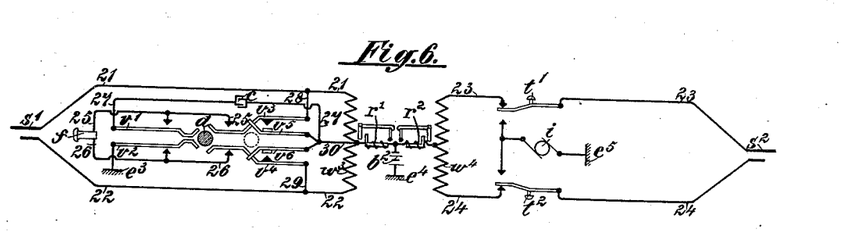
Fig. 6 is a diagram of one of the plug connections at the central stations.

It is desirable that the conversation with the office and with other subscribers should take place through the main line conductors without using the earth, so as to prevent overhearing and interruptions by cross induction, and for this purpose means must be provided to change the connections of the telephone which is connected on the one hand to earth and on the other hand to the conductor through the bridging resistance, so that instead of being so connected the telephone shall be joined across the two conductors of the main line. The arrangements necessary for this purpose are shown in Figs. 5 and 6. At the subscribers' stations, as illustrated for instance at the station I in Fig. 5, the bridging resistance $w^1$ is formed for this purpose as a relay which, when excited, will so act upon the switches $u^1$ and $u^2$ that these will break contact from the conductors 6 and 7 and will make contact respectively with the conductors 5 and 8. When the telephone $f^1$ is removed from its hook, 5 is connected through 4, $h^1$ and 3 with the line 1 and 8 is connected through 10, $h^2$ and 11 with the line 2 so that the telephone $f^1$, which is connected to the pivots of the switches $u^1$ and $u^2$, is switched across the two lines 1 and 2 as required.

Figure 15:
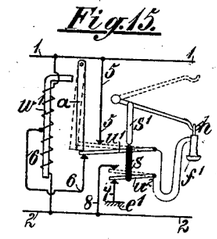

In the switching device of Fig. 15 the position of rest the two arms $u^1$ and $u^2$ of the change over switch for the telephone $f^1$ rest against the earthed conductor 7 on the one hand and the conductor 6 on the other hand which is connected to the mid-point of the bridging resistance. The arms $u^1$, $u^2$ are connected together by a nonconducting bar $s$ and are normally held down by the armature $a$ of the relay $w^1$, which armature acts as a catch; the bar $s^1$ connected to the hook switch $h$ rests upon the bar $s$. If $f^1$ is removed from $h$, $s^1$ rises but $u^1$ and $u^2$ are still held down. The armature $a$ is not drawn back until $w^1$ has been excited by current from the exchange office; when such a current is sent however, $u^1$ makes contact with 5 and $u^2$ with 8 so that the telephone $f^1$ becomes bridged across between the branches 1 and 2 of the circuit. The direct connection of the conductors 5 and 8 with the lines 1 and 2 respectively as shown in Fig. 15 is not actually adopted in practice but is shown for simplicity. The connection actually takes place through the elements 4, $h^1$ and 3 on the one hand and 10, $h^2$ and 11 on the other hand as shown at station I in Fig. 5. The change over switch device can be made in a great number of other forms but these need not be described here because the details of them do not form part of the essence of the invention.

In the foregoing description the sequence of operations in calling up the exchange by a subscriber has been described, as also the selective calling of a subscriber from the exchange and the switching of the telephone at the subscriber's station across the conductors of the main line; in the following description the operations necessary in making connection between two stations will be described. In answering a subscriber the exchange operator will make use of the answering plug $s^1$, Fig. 6; this plug has connected to it devices for switching on the operator's telephone $f$, and for sending currents for changing over the connections of the subscriber's telephone so as to connect it across the main line conductors. The arrangement for this purpose comprises a reversing switch with six arms marked $v^1$ to $v^6$, the positions of which can be changed as required by the action of the cylindrical switch lever $d$ shown in section in the drawing, the position illustrated being the position of rest. If now one of the subscriber's stations, for example station I in Fig. 5, has given a call the exchange operator inserts the answering plug $s^1$ in the jack socket $l$ by which means the calling device $r$ is cut out thus disconnecting it from all subscribers on the common circuit. The switch lever $d$ is then moved to the left by which means the switch pieces $v^1$ and $v^2$ are pressed back to make contact with the conductors 25 and 26 and are thus connected with the telephone $f$. The exchange operator can now communicate with station I because $v^1$ is connected through the line 27 and condenser $c$ to the middle of the bridging resistance $w^3$ and thence through 21 and $s^1$ to the lines 1 and 2 while $v^2$ is connected to earth at $e^3$; the telephone $f^1$ at the subscriber's station is similarly connected to earth on the one hand and through the bridging resistance $w^1$ to the lines 1 and 2 on the other hand so that speaking currents can pass in the same direction over both the conductors of the main line and through the earth. It is desirable however, in order to avoid cross induction and other objectionable influences on the line that the speaking currents should pass through a metallic circuit without an earth connection, and hence the arrangement must be such that it is possible for the exchange operator to connect both his own instrument and that of the subscriber across between the two conductors of the main line and to separate the telephones at the same time from earth. For this purpose the operator moves the switch lever $d$ from its left position so far toward the right that it presses the two switch arms $v^3$ and $v^4$ against the conductors 25 and 26 so that the operator's telephone $f$ which is connected between these two conductors is bridged across the conductors 21 and 22 through the connections 28 and 29, the conductors 21 and 22 being connected by the plug $s^1$ and jack socket $l$ with the lines 1 and 2. As the switch lever $d$ is moved from left to right the switch arms $v^1$ and $v^2$ are disconnected from the conductors 25 and 26 whereby the telephone $f$ is disconnected from earth at $e^3$ and from the bridging resistance $w^3$. If now the switch lever $d$ is moved still farther toward the right it leaves the switch arms $v^3$ and $v^4$ allowing these latter to break contact with the lines 25 and 26, and comes to lie between the switch arms $v^5$ and $v^6$ pressing these against $v^3$ and $v^4$ and thus short circuiting the two branches of bridging resistance $w^3$. The subscriber will have taken his telephone $f^1$ off its hook switch $h^1$, Fig. 5, at the station I so that the midpoint of the bridging resistance $w^1$ is connected between the lines and through the telephone $f^1$ to earth at $e^1$. The battery $b^2$, Fig. 6 will therefore at once send a current through $r^1$ and 30, and on the one hand through $v^5$, $v^3$, 28, 21, $s^1$, top contact of $l$, 1, 3, $h^1$, 4, $w^1$, 6, $u^1$, $f^1$, $u^2$, 7, $e^1$ and $e^4$, and on the other hand through $v^6$, $v^4$, 29, 22, $s^1$, the bottom contact of $l$, 2, 11, $h^2$, 10, $w^1$ and 6, etc., as for the first branch. As this current has not to pass through the high bridging resistance $w^3$ it is so strong that it operates the change over relay formed as the bridging resistance $w^1$, so that the changing over of the connections of the telephone $f^1$ is effected at the station I; the way in which this latter step is effected is already described in connection with Fig. 15. As a rule the telephone operator will not need to use the left hand position of his switch lever $d$; but will usually move it to its furthermost position toward the right in order to connect the telephone of the calling station at once across the lines; the left hand position is only necessary for use in answering any other station on the common line which calls up while a conversation is already going on over the line. This point will be returned to hereinafter. By making the spring levers $v^1$, $v^2$ and $v^5$, $v^6$ of a suitable form and placing them in a suitable position, the result would be attained that when the switch lever $d$ is liberated the strength of these springs will return the lever $d$ in the first instance to its position of rest and in the second instance to its position between the springs $v^3$ and $v^4$; this however, is not illustrated in Fig. 6 in order to avoid confusing the diagram. As soon as the request of the subscriber has been received the exchange operator will insert his calling plug $s^2$ in the jack socket of the line in which the subscriber to be called up is situated. The windings of the bridging resistances $w^3$ and $w^4$ are arranged as a transformer, or in inductive relation one to the other and thus serve as a connection between the plugs $s^1$ and $s^2$. Assuming that the subscriber who is to be called up has the number II this subscriber will be called up by pressing the calling key $t^2$ and the calling current flows through the line as already described above. As the second subscriber removes his telephone $f^2$ from its hook switch the telephone becomes connected as already described in such a way that its speaking currents will flow through the earth, and it is therefore necessary in order to make possible the undisturbed communication between the two stations, that the telephone $f^2$ should be switched across the two conductors of its line. This could be effected by the exchange operator waiting to receive the answer of the called station and then effecting the switching over by a device corresponding to that described for the answering side of the pair of plugs; as however the waiting would occupy the time of the operator too much, the changing over of the connections is preferably effected by an automatic device which is described below with reference to Figs. 10 to 13.

Figure 7:
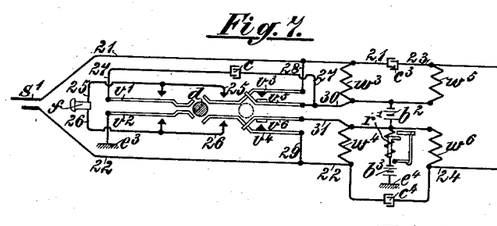
Fig. 7 is a diagram similar to Fig. 6, but showing a somewhat different arrangement, the signal plug being omitted in this figure.

Fig. 7 shows the connections of an answering plug $s^1$ for a central battery system; the arrangement of the connecting plug $s^2$ would be the same as in Fig. 6 and is therefore omitted in Fig. 7. In both the figures the corresponding parts have corresponding reference signs. The devices for switching in the operator's telephone and that of the calling subscriber are almost exactly the same as those of Fig. 6 and their action will be understood from the description of that figure; the arrangement differs from that of Fig. 6 only in that the ends of the switch arms $v^5$ and $v^6$ are not connected together but are separately connected through conductors 30 and 31 with the terminals of the battery $b^2$. For the purpose of sending a current of the requisite strength from the battery $b^2$ to the calling station, in order to switch in the calling telephone, the two parts $w^3$ and $w^4$ of the winding of the bridging resistance of the answering plug $s^1$ are short circuited by the pressing of the switch arms $v^5$ and $v^6$ against the arms $v^3$ and $v^4$ respectively. The calling up of the subscriber asked for is effected exactly as in Fig. 6 and no further description is therefore necessary. The transmission of the speaking currents from the calling side to the answering side of the pair of plugs is effected in this case through the condensers $c^3$ and $c^4$ because the bridging resistances $w^3$, $w^4$ and $w^5$, $w^6$ are not arranged in transforming or inductive relation one to the other. For this arrangement also an automatic device is provided for switching in the telephone of the called subscriber, some forms of construction of this device being illustrated in Figs. 11 and 13 while on the other hand the arrangements for use with Fig. 6 are illustrated in Figs. 10 and 12.

Figure 10:
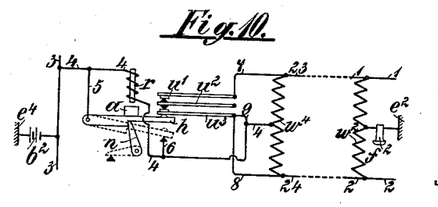
Figs. 10 to 15 are diagrams of different automatic means for switching in the telephone of the called subscriber.

Referring now to Fig. 10, $w^4$ is a winding identical with the bridging resistance $w^4$ of the plug $s^2$ in Fig. 6, and $b^2$ corresponds with the battery $b^2$ of that figure; the relay $r^2$ which serves for giving circuit-completing indication in the arrangement of Fig. 6 is omitted in Fig. 10. An auxiliary relay $r$ is arranged in the connection between the battery $b^2$ and the mid-point of the bridging resistance $w^4$; this relay acts upon the armature $a$ connected with the lever $h$; in the position of rest $h$ lies upon the conductor 6, so that the relay $r$ is short circuited through 5, $h$, 6 and 4. With this arrangement in order to effect the automatic switching in of the telephone of the called station the exchange operator presses back the catch lever $n$, thus moving $h$ and $a$ from the dotted position to that shown in full lines, and at the same time breaking the short-circuit of $r$ while short circuiting the resistance $w^4$ by pressing together the three contact arms $u^1$, $u^2$ and $u^3$. If now the telephone $f^2$ is removed from the hook switch at the called station II which is indicated in Fig. 10 by the bridging resistance $w^2$, the telephone $f^2$ and the earthed point $e^2$, the connections are made as in Fig. 10, and the stronger current from the battery $b^2$ can flow on the one hand through 3, 4, $r$ 9 to $w^3$, and from here on the one hand through $u^1$, 7, 23 and 1 to $w^2$, on the other hand through $u^3$, 8, 24 and 2 to $w^2$, whence the circuit is completed through $f^2$, $e^2$ and $e^4$. When the current flows the bridging resistance $w^2$ which is formed as the connecting relay, effects the connection of the telephone $f^2$ between the line conductors 1 and 2 in the manner already described with reference to Fig. 15. The current from the battery $b^2$ also energizes the relay $r$ by which means the armature $a$ and the lever $h$ connected thereto are drawn up whereupon the catch pawl $n$ is released and is allowed to fall back to its position of rest shown in dotted lines. The earth connection $e^2$ is broken in consequence of the switching over of the connections of the telephone $f^2$, thus interrupting the circuit for the current from $b^2$ and allowing the armature $a$ and lever $h$ to be released so that the short circuit upon $r$ is again closed, and the switch arms $u^2$ and $u^3$ are released breaking the short circuit of $w^4$. The normal position is thus reinstated. The current from $b^2$ which would flow if another subscriber on the same line as II were to take his telephone from the hook, would have to traverse the comparatively high resistance of $w^4$ and would not be sufficiently strong to effect the switching over of the connections of the raised telephone so as to put it across the branches of the line.

Figure 12:
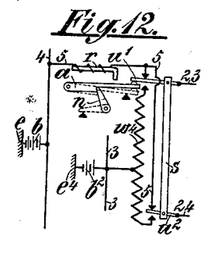

Fig. 12 shows another method of getting the desired result according to which the change over of connections of the telephone of the called subscriber is effected by means of a special battery $b$. After the calling up of the station by the exchange operator this operator presses up the catch pawl $n$ against the lever which forms the armature $a$ of the relay $r$ thus effecting the moving over of the levers $u^1$ and $u^2$, which are connected by the bar $s$, so as to make them break contact with the ends of the resistance $w^4$ and to make connection with the earthed battery $b$ through the line 5 and the relay $r$. The battery $b$ is so powerful that it will effect the switching over of the connections of the telephone at the called station as soon as this station is put into the condition indicated at the right hand side in Fig. 10 by the removal of the receiver from its hook switch. The relay $r$ is consequently excited and draws up the armature $a$ releasing the pawl $n$; when the connecting of the telephone $f^2$ across the lines has been completed the earth connection is broken and therefore the circuit of $b$ is interrupted so that the armature $a$ returns to its normal position allowing the switch arms $u^1$ and $u^2$ to fall back, so that the normal resistance of the line is again restored. If the battery $b^2$ which serves to indicate the closing of the circuit, is sufficiently strong, and if the resistance of the relay $r$ is made sufficiently small as compared with that of the bridging resistance $w^4$, the battery $b^2$ may be used for changing over the connections of the called subscriber's telephone, so that the necessity for a separate battery $b$ is avoided.

Figure 11:
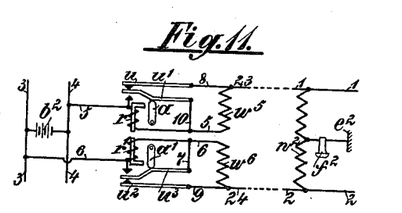

In Fig. 11 the battery $b^2$ and the two halves $w^5$, $w^6$ of the bridging resistance are identical with the corresponding elements of Fig. 7 in which corresponding reference letters are used. On the two ends of $w^5$ and $w^6$ spring contact arms are provided for short circuiting purposes. In the wires 5 and 6 leading from the battery $b^2$ to $w^5$ and $w^6$ two auxiliary relays $r$ and $r^1$ are arranged the armatures $a$ and $a^1$ of which are in their position of rest when drawn up by the relays. The two armatures are brought into their operative positions by the exchange operator as soon as the call has been given to the subscriber, and these armatures thus cause the resistances $w^5$ and $w^6$ to be short circuited through the contacts $u$ and $u^1$ and $u^2$, $u^3$ respectively. As soon as the telephone $f$ is removed from its hook switch at the called station II it becomes connected to earth as indicated at the right hand side of Fig. 11 so that the full battery current flows from $b^2$ through 4, 5, $r$, 10, $u^1$, $u$, 8, 23, 1, $w^2$, 2, 24, 9, $u^2$, $u^3$, 7, $r^1$, 6, and 3 back to the battery $b^2$, effecting the switching over of the connections of the telephone $f^2$ in the manner already described. The current which effects this switching over, also excites the relays $r$ and $r^1$ so that these latter are caused to draw up their armatures $a$ and $a^1$ thus allowing the short circuits of $w^5$ and $w^6$ to be broken owing to the release of the switch arms $u^1$ and $u^3$, so that the normal conditions are reinstated because the relays $r$ and $r^1$ become at once short circuited by the contact pieces $u^1$ and $u^3$. In practice usually the two relays $r$ and $r^1$ would be combined in one; the division into two parts is only adopted for clearness in the diagram.

Figure 13:
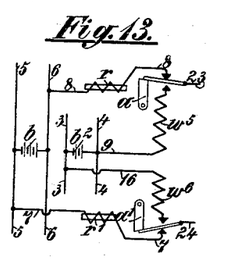

Fig. 13 shows an arrangement applicable to Fig. 11 in the same way as the arrangement of Fig. 12 is applicable to Fig. 10 and the description of Fig. 12 already given will make it unnecessary to supply a separate description of Fig. 13.

In order to reduce the number of operations necessary at the exchange station in connecting together two subscribers, and also to avoid the risk that the operator might forget to switch on the battery for changing over connections, it appears to be desirable to so arrange the apparatus that the setting of the pawl $n$ in Figs. 10 and 12, or of the armatures $a$ and $a^1$ in Figs. 11 and 13, should be effected by the operation of depressing the calling key and this can be readily done by the use of any suitable coupling between the two parts.

In the arrangements of Figs. 6 and 7 switching devices are provided in connection with the answering plug $s^1$ for effecting the changing over of connections of the telephone of a calling subscriber so as to bridge his instrument across the branches of the line by automatic means following upon the giving of a call. According to those arrangements the current for switching purposes is caused to be sent at the necessary strength to the calling stations by short circuiting the bridging resistance of the answering plug. The switching over of the connections for the called station can also be effected in a corresponding way to that of Figs. 12 and 13 by the current of a separate battery, and the arrangement for this purpose is illustrated in Fig. 8 as applied to the switching device and connections of Fig. 7.

Figure 8:
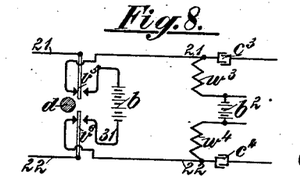
Fig. 8 is a diagram of a somewhat different arrangement of a portion of the switching device and connections of Fig. 7.

Fig. 8 shows the switching arms $v^5$, $v^6$ of Fig. 7 in a somewhat modified form and also shows the switching lever $d$, the bridging resistance coils $w^3$, $w^4$ and the central battery $b^2$, in addition to which the separate battery $b$ is provided; the remaining parts of the telephone switch are omitted as they are not necessary in connection with the operations now about to be described.

If the necessary current for the operation of the switching relay indicated by $w^1$ in Fig. 15, is to be sent to the calling station, the lever $d$ is brought to its farthermost position toward the right by which means firstly the two branches 21 and 22 of the plug lines are disconnected from the bridging resistance $w^3$, $w^4$, and secondly the parts of these lines connected to the plug are put in connection through $v^5$ and $v^6$ and the wires 30 and 31 with the battery $b$; this battery then supplies the desired current to the calling station, and there effects the change over of connections of the telephone in the manner described in connection with Fig. 15. In order to apply this arrangement to the system as indicated in Fig. 6 the battery $b$ of Fig. 8 would have to be connected in such a way that one of its poles was earthed while the other was connected to both of the wires 30 and 31 leading to their corresponding contacts for the switches $v^5$ and $v^6$.

In place of the method of changing the connections of the telephone of a calling subscriber by the automatic switching above described, there is another possible method consisting in making the calling battery $b$ (Figs. 1 and 5) strong enough for its current to be able to operate the change over switch relay $w^1$, Fig. 15. In this case however, in order to insure that only the one of the stations on the line shall be connected across the two conductors when it is giving a call, the calling device at the exchange station must be arranged as in Fig. 9. This arrangement corresponds in most respects with Fig. 1 except that the armature of the calling relay $r$ serves two purposes, firstly to close the local circuit of the battery $b^1$ for causing the circuit closing signal $g$ to be operated, and secondly to open the short circuit of a resistance $w$ (which is normally short circuited) so as to throw this resistance $w$ into the circuit of the battery $b$, the resistance being large enough to reduce the current from $b$ to such an extent that although it will still hold up the armatures $a$ and $a^1$ of the calling relay $r$ yet it will not be strong enough then to operate the change over relay $w^1$, Fig. 15 for the telephone of another calling subscriber. In order to simplify Fig. 9 the calling relay $r$ is shown provided with two armatures $a$ and $a^1$ each of which fulfils one of the purposes above stated; in practice however, both purposes would usually be fulfilled by the same armature which would have two contact arms as will be well understood. Again for the same reason in Fig. 9 the resistance $w$ is shown arranged only in the conductor connected to the line 1 leading to the calling relay $r$; there is no reason however, why such a resistance $w$ should not also be arranged in the conductor leading from the line 2.

In case the exchange operator's apparatus is constructed as in Fig. 5 the arrangement of Fig. 9 has to be modified accordingly but the modification will be obvious and requires no separate illustration.

In making connections between two subscribers it will usually be the case that two telephones are to be connected which lie on two different conducting lines; the description above given of the various steps which occur in making connection rests upon the supposition that the lines are different. The case may however, arise in which two subscribers connected to the same line are to be put into communication and the sequence of operations for this purpose will now be described in connection with Figs. 5 and 6 on the assumption that station I desires to communicate with station II. The calling up of the exchange and the replying from the exchange occurs exactly in the same way as before described; for calling up station II the exchange operator will draw the answering plug $s^1$ out of the jack socket $l$ and insert in place thereof the calling plug $s^2$; after this the calling key $t^2$ is pressed causing the battery to be switched on which serves to effect the change of connections of the telephone $f^2$ at station II; the descriptions of Figs. 6, 10 and 12 will explain what occurs under these circumstances. As soon as the subscriber at station II which is called up, takes his telephone $f^2$ off its hook switch the telephone will be immediately connected across between the two branches of the common line whereupon the conversation can begin immediately because station I is already in talking connection as it would be for giving a call to a subscriber on another line. The currents for calling up station II and switching in the telephone at that station have very little effect on the telephone at station I and serve to indicate to the calling subscriber that the call is being given.

It still remains to explain the manner in which the indication is given when the conversation is at an end. It is given by hanging up the telephones on the hook switches by the subscribers. In Fig. 6 the relays $r^1$ and $r^2$ are provided as circuit closing indicators and may be formed as "drop" indicators, or they may serve as in Figs. 1 to 5, just as in the calling relay, for closing a local circuit with a visible sign such as a glow-lamp. As soon as one of the two connected subscribers, for example I in Fig. 5 hangs up the telephone $f^1$, the bell $h^1$ at this station is switched into circuit through the condenser $c^1$ to earth at $e^1$. It is now necessary that the condenser $c^1$ should be short circuited on hanging up the telephone $f^1$ in order that the earthed indicator battery $b^2$, Fig.

Figure 16:
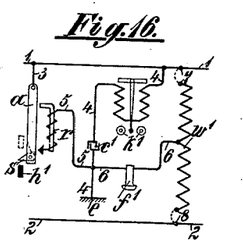
Figs. 16 and 17 are diagrams of different arrangements for indicating the termination of the intercommunication between two connected local stations.

6 should be able to send a current; this can be effected by means of the device shown in Fig. 16. In this figure, $r$ is a relay having an armature $a$ provided at its lower end with a catch pawl $s$; $h^1$ indicates the hook switch for the telephone $f^1$ seen in cross section, the rectangle seen in full lines indicating the position of the hook when the telephone is on, while the dotted rectangle indicates the position of the hook when the telephone is taken off. When the hook switch is pulled down the consequence of the hanging of the telephone on it presses back the armature $a$ in passing the pawl $s$ which cannot turn any farther downwardly, and the armature is caused to close an earthed circuit through the connections of 1 to 3, $a$, $r$, 5, 4, and $e$. The indicator battery $b^2$, Fig. 6, can therefore send a current at once through $r^1$, $w^3$, 21, $s^1$, $l$, 1, and the earthed connection just described, so that the indicating relay $r^1$, Fig. 6, is operated to show the completion of a conversation; the relay $r^2$ will be operated in a similar way from the called station. The relay $r$ in Fig. 16 will hold the earthed connection closed until the circuit operating the closing sign is broken by withdrawing the plug from the socket $l$ so that the closing or competing sign will be visible until the circuit is broken. The relay $r$ in Fig. 16 may be omitted if the indicating relays $r^1$ and $r^2$ in Fig. 6 are made as "drops" for the release of which only a short current impulse is necessary as is well known; in this case the short circuiting would be sufficiently effected by the pressing back of the lever $a$ by the pawl $s$ against a contact on the conductor 5. In any case of course the switching lever $h^1$ presses up the pawl $s$ when it rises so that the arm $a$ is not operated except when the telephone is hung upon the hook switch.

Figure 17:
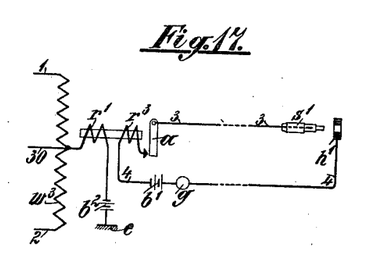

If it is desired to make the relay $r$ unnecessary at the subscribers' stations when signs other than "drops" are used, which may be desirable under some circumstances when there are a great many such stations, a continuous sign indicating the completion of the conversation can be given by the action of the battery $b^2$ at the exchange, if an arrangement as in Fig. 17 is used. In this arrangement the completing relay $r^1$ is provided with a second winding $r^3$ which is included in the local circuit of the indicator $g$; this circuit then includes on the one hand the stem of the corresponding plug $s^1$ and on the other hand a connection leading to the sockets of all the jacks at the exchange. If $r^1$ is excited in consequence of the making of an earthed connection on one of the conductor lines 1 or 2, allowing the current from $b^2$ to flow even for a very short time, the armature $a$ will be drawn up against the contact of the winding $r^3$ thus closing the local circuit because the plug $s^1$ must of course be in the plug socket $h^1$, Fig. 17. The current of the local battery $b^1$ flowing through $r^3$ will cause the armature $a$ to be held up and the closing sign $g$ to indicate until the local circuit is broken by drawing the plug $s^1$ out from the socket $h^1$. In the arrangement of Fig. 7 the battery $b^2$ supplies current during the whole period of connection of two subscribers in a speaking circuit, this current flowing from the exchange through the bridging resistances $w^3$, $w^4$ and $w^5$, $w^6$ through the plugs to the line and the telephones (see for instance Fig. 5 and Fig. 15). As soon as the telephones are hung up both these and the bridging resistances are cut off from the lines (see for instance Figs. 2 and 3) so that the circuits of the battery $b^2$ are broken. If the bridging resistances $w^3$, $w^4$, and $w^5$, $w^6$, or any one of each pair are formed as relays, these may be used for giving the closing or completing sign. The arrangement in Fig. 7 is suitable for this purpose because in that figure the windings are not arranged in inductive relation; the transmission of the speaking currents from one plug to the other is effected in that case through the condensers $c^3$ and $c^4$.

Figure 14:
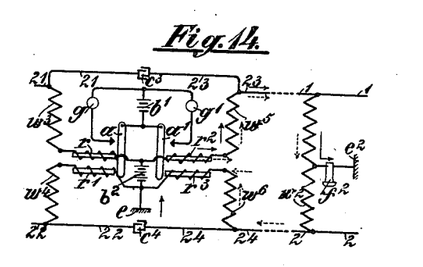

If a subscriber takes his telephone from the switch hook in order to call up the exchange at any time while another subscriber on the same line is already in a conversation, an earthed connection is formed as will be easily seen in Fig. 5 through the telephone which is connected to the midpoint of the corresponding bridging resistance. In the arrangement of Fig. 6 the battery $b^2$ will be consequently caused to send a current over the line in question thus operating the closing sign in the same way as it is operated at the end of a conversation as already explained. The exchange operator can then connect his telephone $f$ to earth on one side by moving his switch lever $d$ toward the left, the other terminal of the telephone being connected to the midpoint of the resistance $w^3$ so that the operator can communicate with the station which is calling without disturbing the connections through the two lines of the stations which are already speaking through these lines. The exchange operator can communicate with either side of the pair of plugs owing to the inductive relation of the windings $w^3$ and $w^4$. If the station which is calling up is not in urgent need of making a connection the subscriber is required to wait until the completion of the conversation through the connections already made. In case of urgency, however, the exchange operator can cut off the connections already existing first sending a predetermined notice or indication to the stations if required. In order to make the calling up of the exchange possible with the arrangement according to Fig. 7 an earthed battery $b^3$ is provided connected through the winding of an indicator $r^1$ with the pair of plugs $s^1$, $s^2$. The operation of this arrangement is just the same as already described for Fig. 6 and requires therefore no further explanation. The arrangement of Fig. 7 has however, the disadvantage that the exchange operator cannot tell without asking through the lines, from which side the further call is coming. The arrangement of Fig. 14 is designed to avoid this disadvantage. In this arrangement the battery $b^2$ is earthed on one side at $e$, and between the battery and bridging resistances $w^3$, $w^4$, and $w^5$, $w^6$ relays $r$, $r^1$ and $r^2$, $r^3$ are arranged the windings of which are equal and wound to oppose one another; armatures $a$, $a^1$ are provided in connection with the differential relays so constructed, which armatures can close and open the local circuits for the signals $g$ and $g^1$ from the common battery $b^1$. If the telephone is lifted from its switch hook to call the exchange from another station on one of the lines which is already in conversation, this telephone closes a circuit as indicated at the right hand side of Fig. 14, and two circuits are closed from the battery $b^2$; the circuit indicated by the dotted arrows is through $r^2$, $w^5$, 23, 1, $w^2$, 2, 24, $w^6$, and $r^3$, while the other shown by full arrows is through $r^2$, $w^5$, 23, 1, half of $w^2$, $f^2$, $e^2$ and $e$. The current in the first of these circuits only produces magnetic effects which oppose one another in the windings $r^2$ and $r^3$ so that only the extra current due to the second circuit in the winding $r^2$ is effective, and the differential relay $r^2$, $r^3$ will draw up the armature $a^1$ allowing the current from the local battery to flow through the indicator $g^1$, so that the operator sees at once on which line the subscriber then calling is situated.

I declare that what I claim is:—

1. In a telephone or telegraph system having a central station and outgoing and return conductors constituting a multi-party line, a bridging resistance and an earth connection at each subscriber's station, the bridging resistance also constituting a relay, means for connecting the subscriber's instrument on one side to the earth connection and on the other side through the bridging resistance to both line conductors, and means coacting with the relay side of the bridging resistance for causing the disconnecting of the subscriber's instrument from the earth and bridging resistance on the establishment of speaking conditions and the connecting of such instrument across the line conductors.

2. In a telephone or telegraph system having a central station and outgoing and return conductors constituting a multi-party line, a bridging resistance and an earth connection at each subscriber's station, the bridging resistance also constituting a relay, means for connecting the subscriber's instrument on one side to the earth connection and on the other side through the bridging resistance to both line conductors, and means coacting with the relay side of the bridging resistance for causing the disconnecting of the subscriber's instrument from the earth and bridging resistance on the establishment of speaking conditions and the connecting of such instrument across the line conductors, and plug connections at the central station for establishing communication between two subscribers, said connections including bridging resistances, calling devices, the latter at one part connected with the midst of the bridging resistances, at the other part with a source of electric current connected to earth.

3. In a telephone or telegraph system having a central station and outgoing and return conductors constituting a multi-party line, a bridging resistance and an earth connection at each subscriber's station, the bridging resistance also constituting a relay, means for connecting the subscriber's instrument on one side to the earth connection and on the other side through the bridging resistance to both line conductors, means coacting with the relay side of the bridging resistance for causing the disconnecting of the subscriber's instrument from the earth and bridging resistance on the establishment of speaking conditions and the connecting of such instrument across the line conductors, and plug connections at the central station for establishing communication between two subscribers, said connections including bridging resistances, calling devices, the latter at one part connected with the midst of the bridging resistances, at the other part with a source of electric current connected to earth, the earthed current source having included in circuit therewith a differential relay to which latter it is connected between the two differential windings.

4. In a telephone or telegraph system having a central station, and outgoing and return conductors constituting a multi-party line, a bridging resistance and an earth connection at each subscriber's station, the bridging resistance also constituting a relay, and plug circuits at the central station for establishing communication between two subscribers' stations, said plug circuits each including bridging resistance, an earth connection, means for bridging the central station instrument across the lines, means for connecting the central station instrument on one side to the earth connection and on the other side to the bridging resistances, and means for sending currents to line to operate the bridging-resistance-relays at the subscribers' stations to connect the instruments there located across the line conductors.

5. In a telephone or telegraph system having a central station, and outgoing and return conductors constituting a multi-party line, a bridging resistance and an earth connection at each subscriber's station, the bridging resistance also constituting a relay, and plug circuits at the central station for establishing communication between two subscribers' stations, said plug circuits each including bridging resistance, an earth connection, means for bridging the central station instrument across the lines, means for connecting the central station instrument on one side to the earth connection and on the other side to the bridging resistances, and means for sending currents to line to operate the bridging-resistance-relays at the subscribers' stations to connect the instruments there located across the line conductors, the central station means including a battery and relay devices for furnishing the current to operate the means at the subscribers' stations for coupling the subscriber's instrument across the line conductors, and another battery for giving the closing indication when the subscribers are through, the second battery being automatically included as soon as speaking conditions are established.

6. In a telephone or telegraph system having a central station and outgoing and return conductors constituting a multi-party line, a bridging resistance constituting a relay and an earth connection at each subscriber's station, a battery at the central station, and bridging resistances and relay devices associated with said battery, said relay devices first cutting out the resistances to cause the battery to furnish current to establish speaking conditions at the called subscriber's station, and then reëstablishing the original conditions at the central station.

7. In a telephone or telegraph system having a central station and outgoing and return conductors constituting a multi-party line, each subscriber's station having a bridging resistance constituting a relay winding, an earth connection, a change-over switch and a hook switch, the relay winding causing the operation of the change over switch, and the hook switch when operated by the hanging of the subscriber's instrument thereon causing the restoration of normal conditions.

In testimony whereof I affix my signature, in presence of two witnesses.

GEORG RITTER.

Witnesses:
KARL JASPER,
RUDOLF WALTERS.

---

Copies of this patent may be obtained for five cents each, by addressing the "Commissioner of Patents, Washington, D. C."